Aug. 26, 1958

H. E. HOLLMANN 2,849,628

VARIABLE FREQUENCY CRYSTAL DEVICE

Filed June 12, 1953

INVENTOR.
HANS E. HOLLMANN

BY [signature]
[signature]
ATTORNEYS

United States Patent Office 2,849,628

Patented Aug. 26, 1958

2,849,628

VARIABLE FREQUENCY CRYSTAL DEVICE

Hans E. Hollmann, Oxnard, Calif.

Application June 12, 1953, Serial No. 361,447

2 Claims. (Cl. 310—8.1)

(Granted under Title 35, U. S. Code (1952), sec. 266)

The invention described herein may be manufactured and used by or for the Government of the United States of America for governmental purposes without the payment of any royalties thereon or therefor.

The present invention relates to a variable frequency crystal device adapted to be employed for frequency control purposes in electrical circuits and more particularly to a variable frequency crystal device including a piezoelectric crystal and an associated nonlinear capacitor having a dielectric composed of a ferroelectric substance.

The present invention is adapted to be utilized in oscillatory circuits wherein the piezoelectric crystal of the invention device is adapted to stabilize the oscillations of the circuit, and the associated nonlinear capacitor is adapted to vary the resonant frequency of the crystal in accordance with control voltages impressed upon the capacitor. Crystal stabilized oscillatory circuits wherein the resonant frequency of the crystal is varied in accordance with control voltages and the utilization of such circuits are well-known as shown for instance in U. S. Patent No. 2,438,392.

Prior art circuits employ reactance tubes and similar electronic apparatus for controlling the resonant frequency of the crystals thereof in accordance with control voltages and are consequently complicated and expensive in construction. Furthermore, such circuits have proved to be unsatisfactory when operating in the V. H. F. and microwave frequency range due to the parasitic impedance and stray capacitance created by the additional electronic components required to control the resonant frequency of the crystals.

The present invention utilizes an arrangement wherein a nonlinear capacitor having a dielectric composed at least partially of a ferroelectric substance is employed to control the resonant frequency of the crystal of the device, thereby eliminating the complicated electronic circuitry required in prior art devices. The invention device is constructed as a compact unit in which certain members serve as components of both the crystal assembly and the capacitor assembly and thereby perform a dual function. The device reduces the parasitic impedance and stray capacitance in the circuit to a minimum and therefore, circuits utilizing the present invention may be satisfactorily operated in the V. H. F. and microwave frequency range.

The term "ferroelectric substance" as used herein designates those substances having nonlinear electrical properties and in which individual molecular displacements caused by a polarizing field simultaneously change the dielectric constant or permittivity, the A. C. conductivity, the dielectric losses and the power factor of the substance. Such ferroelectric substance exhibit hysteresis loops very similar to those of ferromagnetic materials, the difference being that whereas the ferromagnetic hysteresis loops are formed because of the magnetic fields within the substance and the resulting parallel orientation of electron spins of magnetic dipoles, the ferroelectric hysteresis loops are the result of the alignment of electric dipoles by mutual interaction of the nonmagnetic crystalline structure. Ferroelectric substances which may be utilized for the purpose of the invention are Rochelle salt, alkaline earth titanates such as barium, strontium and magnesium titanates, and mixtures of such titanates, mixtures of barium and lead zirconates, and the like. It should be understood, however, that other ferroelectric substances in addition to those mentioned above can be employed according to the invention.

An object of the present invention is the provision of a new and novel variable frequency crystal device in which the parasitic impedance and stray capacitance are reduced to a minimum.

Another object is to provide a variable frequency crystal device which is compact, sturdy and inexpensive to manufacture, yet is sensitive and reliable in operation.

Other objects and many of the attendant advantages of this invention will be readily appreciated as the same becomes better understood by reference to the following detailed description when considered in connection with the accompanying drawings wherein.

Figure 1:
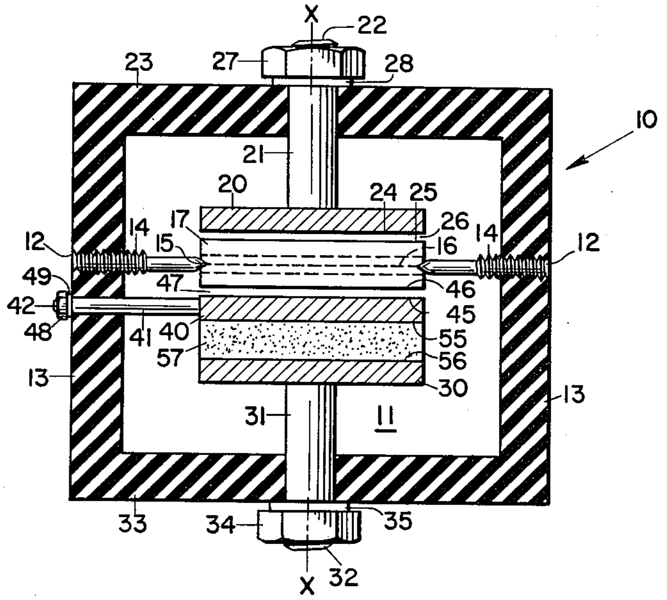
Fig. 1 is a sectional view of a preferred embodiment of the invention.

Referring now to the drawing, there is shown in Fig. 1 a body member indicated generally by numeral 10 which is composed of an electrically nonconductive material such as hard rubber, synthetic resins or the like, and which has an enclosed chamber 11 formed therein. The outer periphery of the body member is cylindrical in shape and the device is symmetrical about the longitudinal axis *x—x* thereof. Three threaded openings 12, only two of which are shown, are equally spaced circumferentially about the cylindrical wall 13 of member 10 and screws 14 having corresponding threads on one end portion thereof are adapted to be adjustably threaded into each of said openings. The opposite end portions 15 of each of said screws is tapered preferably to a needle point and is adapted to seat in a correspondingly tapered groove 16 formed in the outer periphery of a substantially disk-shaped piezoelectric crystal 17. In this manner, crystal 17 is supported in a desired position within chamber 11 and is adapted to vibrate with respect to the body member 10.

A substantially disk-shaped electrode 20 is formed of a suitable electrically conductive material such as brass, aluminum or the like, and has a centrally located longitudinally extending cylindrical part 21 formed integral therewith having screw threads formed on an end portion 22 thereof. Part 21 is centrally mounted within an end wall 23 of member 10 such that portion 22 is disposed exteriorly of the body member and the lower surface 24 of electrode 20 is spaced from the upper face 25 of crystal 17 by a small air gap 26. A nut 27 is adapted to be threaded on end portion 22 of member 21 whereby a suitable connecting electrode 28 may be clamped between the nut and wall 23.

A substantially disk-shaped electrode 30 similar to electrode 20 has a centrally located longitudinally extending cylindrical part 31 formed integral therewith having screw threads formed on an end portion 32 thereof. Part 31 is centrally mounted within an end wall 33 of member 10 such that portion 32 is disposed exteriorly of the body member. A nut 34 is adapted to be threaded on end portion 32 of member 31 whereby a suitable connecting electrode 35 may be clamped between the nut and end wall 33

A substantially disk-shaped electrode 40 similar to electrodes 20 and 30 has a cylindrical part 41 formed integral therewith and extending from the outer periphery thereof. Part 41 has screw threads formed on an end portion 42 thereof, and the part is mounted within wall 13 such that portion 42 is disposed exteriorly of the body member and the upper surface 45 of electrode 40 is spaced from the lower face 46 of crystal 17 by a small air gap 47. A nut 48 is adapted to be threaded on end portion 42 of member 41 whereby a suitable connecting electrode 49 may be clamped between the nut and wall 13.

Disposed between the lower surface 55 of electrode 40 and the upper surface 56 of electrode 30 and being in contact therewith is a substantially disk-shaped dielectric 57 composed of a ferroelectric substance which may preferably be a mixture of barium and strontium titanate in a proportion of about 75% barium titanate and about 25% strontium titanate by weight. It is therefore apparent that electrodes 30 and 40 and dielectric 57 therebetween comprise a nonlinear capacitor assembly, and as is well known in the art, the dielectric constant and therefore the capacitive reactance of such a capacitor varies in accordance with the electrical voltages impressed thereon.

Electrodes 20, 40 and piezoelectric crystal 17 comprise a crystal assembly, and such an assembly is adapted to stabilize an oscillatory circuit when suitably connected in the circuit such that the oscillating voltage thereof is impressed on electrodes 20 and 40.

As is shown in U. S. Patent No. 2,438,392, a variable reactive electrical element connected either in series or parallel or series and parallel with a piezoelectric crystal is adapted to control the resonant frequency of the crystal. Accordingly, by suitably connecting electrodes 28, 35 and 49 in an electrical circuit, the capacitor assembly and the crystal assembly of the invention device may be connected in series or in parallel, and a suitable oscillating voltage may be impressed upon electrodes 20 and 40 of the crystal assembly and a suitable control voltage may be impressed on electrodes 30 and 40 of the capacitor assembly. A suitable bias voltage may also be impressed upon the capacitor assembly in a well-known manner. Since the reactance of the capacitor assembly will vary in accordance with the control voltage impressed thereon and the resonant frequency of the crystal depends on the reactance of the capacitor assembly, the resonant frequency of the crystal is accurately varied in accordance with changes in the control voltage. The control voltage may be for example a D. C. voltage for purposes of automatic tuning and the like, or it may be audio, television or telemetry signals superimposed upon a suitable bias It should be noted that member 40 performs a dual function in serving as an electrode in both the crystal assembly and the capacitor assembly. Consequently, the invention device employs only three electrodes and does not require any additional connections between the assemblies, thereby reducing the parasitic impedance and stray inductance of the device to a minimum.

Figure 2:
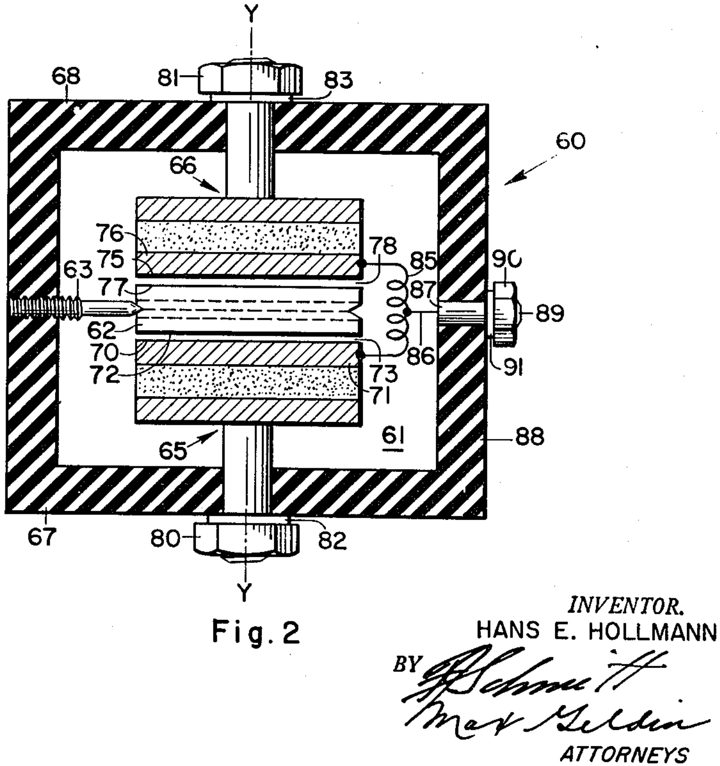
Fig. 2 is a sectional view of a modification of the invention.

Fig. 2 illustrates a modification of the device wherein a body member indicated generally by numeral 60 is composed of an electrically nonconductive material such as hard rubber, synthetic resins or the like and has an enclosed chamber 61 formed therein. The outer periphery of the body member is cylindrical in shape and the device is symmetrical about the longitudinal axis $y—y$ thereof. A disk-shaped piezoelectric crystal 62 is supported within the body member in the same manner as crystal 17 of Fig. 1, only one adjustable screw 63 being shown.

Two identical nonlinear capacitor assemblies having dielectrics composed of a ferroelectric substance are indicated generally by numerals 65 and 66 and each assembly is similar to the capacitor assembly of Fig. 1, the only difference being that electrodes 71 and 76 corresponding to electrode 40 to Fig. 1 do ot have a cylindrical part corresponding to member 41. Assembly 65 is centrally mounted in one end wall 67 of the body member and assembly 66 is centrally mounted in the opposite end wall 68 of the body member. The upper surface 70 of electrode 71 in assembly 65 is spaced from the lower face 72 of the crystal by an air gap 73 and the lower surface 75 of electrode 76 in assembly 66 is spaced from the upper surface 77 of the crystal by an air gap 78. Nuts 80 and 81 are provided on the threaded end portions of assemblies 65 and 66 respectively whereby suitable connecting electrodes 82 and 83 may be connected to the respective assemblies.

An inductance coil 85 is connected between electrodes 71 and 76 and the coil is center tapped by a lead 86 which connects the coil to a cylindrical member 87 mounted in wall 88 of body member 60 and having a threaded end portion 89. A nut 90 is adapted to be threaded on portion 89 whereby a connecting electrode 91 may be clamped between the nut and wall 88. Suitable control voltages may thereby be applied to electrodes 71 and 76 of capacitor assemblies 65 and 66 respectively through coil 85.

Electrodes 71, 76 and piezoelectric crystal 62 comprise a crystal assembly and the device may be suitably inserted in a circuit so as to impress an oscillating voltage on electrodes 71 and 76. Coil 85 serves as a choke to the oscillating voltages applied to electrodes 71 and 76 and thereby prevents the crystal assembly from being short circuited when R. F. voltages are applied thereto.

Each of the nonlinear capacitor assemblies and the crystal assembly of Fig. 2 operates in a manner similar to the corresponding elements in Fig. 1, and a suitable bias voltage may be impressed upon the capacitor assemblies in a well-known manner. It is evident that by suitably connecting electrodes 82, 83 and 91 in an electrical circuit, the resonant frequency of the crystal will be accurately varied in accordance with changes in the control voltage applied to the capacitor assemblies. Since two nonlinear capacitors are provided in the device shown in Fig. 2, the device is more sensitive to changes in the control voltage than is the device shown in Fig. 1. It should be noted that members 71 and 76 each perform dual functions just as member 40 in Fig. 1 and therefore the parasitic impedance and stray inductance of the device is reduced to a minimum.

While the two electrodes of the crystal assemblies in each of the devices shown in Figs. 1 and 2 are spaced from the opposite faces of the crystals by minute air gaps, it should be understood that the crystal assembly electrodes may be disposed in frictional contact with the opposite faces of the crystals. In other words, in the device shown in Fig. 1, surface 24 may be in contact with face 25 and surface 45 may be in contact with face 46; and in the device shown in Fig. 2, surface 70 may be in contact with face 72 and surface 75 may be in contact with face 77. Although the crystal electrodes will tend to damp oscillations of the crystals when the electrodes are in frictional contact with the opposite faces of the crystals, such damping will be negligible when the device is operated in the V. H. F. and microwave frequency range. It should be noted that such an arrangement further reduces the parasitic impedance and stray capacitance of the device. Furthermore, if the piezoelectric crystals are clamped between the electrodes of the respective crystal assemblies, no additional support is necessary for the crystals, and the circumferential groove in the crystals and the tapered screws seated therein may be eliminated if desired.

Although the body member is preferably cylindrical, and the crystal and electrodes of the present invention are preferably disk-shaped in configuration, other configurations may be utilized if desired. Moreover, any suitable means may be provided for supporting the crystal and electrodes in operative position within the body member.

It is evident from the foregoing that there is provided a new and novel variable frequency crystal device wherein the parasitic impedance and stray capacitance created during operation thereof are reduced to a minimum. The device is compact, sturdy and inexpensive to manufacture, yet is sensitive and reliable in operation.

Obviously many modifications and variations of the present invention are possible in the light of the above teachings. It is therefore to be understood that within the scope of the appended claims the invention may be practiced otherwise than as specifically described.

I claim:

1. A variable frequency crystal device which comprises a piezoelectric crystal, a first nonlinear capacitor including a dielectric composed at least partially of a ferroelectric substance and having a first electrode disposed adjacent one face of said crystal, a second nonlinear capacitor including a dielectric composed at least partially of a ferroelectric substance and having a second electrode disposed adjacent another face of said crystal, said first and second electrodes being adapted to cause vibrations of said crystal when an oscillating voltage is impressed thereon, and an inductor connected between said first and second electrodes to serve as a choke coil to the said oscillating voltage.

2. A variable frequency crystal device which comprises a body member having an enclosed chamber formed therin, a piezoelectric crystal disposed within said chamber, means mounted in said body member for supporting said crystal in a desired position, a first electrode disposed within said chamber and being disposed adjacent a first face of said crystal, a second electrode disposed within said chamber and being spaced from said first electrode, a dielectric composed of a ferroelectric substance disposed between and in contact with said first and second electrodes, a third electrode disposed within said chamber and being disposed adjacent a second face of said crystal, a fourth electrode disposed within said chamber and being spaced from said third electrode, a dielectric composed of a ferroelectric substance having a nonlinear charge vs. applied voltage characteristic disposed between and in contact with said third and fourth electrodes, means whereby said first and third electrodes may be connected across a source of oscillatory voltage, means for impressing a control voltage across said first and second electrodes and across said third and fourth electrodes, and an inductor connected between said first and third electrodes to serve as a choke coil for the oscillatory voltage from said source.

References Cited in the file of this patent

UNITED STATES PATENTS

| | | |
|---|---|---|
| 2,002,167 | Bechmann | May 21, 1935 |
| 2,004,170 | Moser | June 11, 1935 |
| 2,157,665 | Hollmann | May 9, 1939 |
| 2,260,707 | Fair | Oct. 28, 1941 |
| 2,306,555 | Mueller | Dec. 29, 1942 |
| 2,321,285 | Ehret | June 8, 1943 |
| 2,390,048 | Bach | Dec. 4, 1945 |
| 2,461,307 | Antalek | Feb. 8, 1949 |
| 2,508,720 | Kuenstler | May 23, 1950 |
| 2,526,207 | Donley | Oct. 17, 1950 |
| 2,555,959 | Curtis | June 5, 1951 |
| 2,663,006 | Anderson | Dec. 15, 1953 |
| 2,719,223 | Van Der Ziel et al. | Sept. 27, 1955 |